United States Patent
Martin et al.

(10) Patent No.: US 12,333,635 B2
(45) Date of Patent: Jun. 17, 2025

(54) SYSTEMS AND METHODS FOR AUTOMATICALLY ADJUSTING DESIGN ELEMENT ATTRIBUTES

(71) Applicant: Canva Pty Ltd, Surry Hills (AU)

(72) Inventors: Tristan Martin, Sydney (AU); Desiree Surjadi, Sydney (AU); Inkesar Ali Mudassir Mohammed, Sydney (AU)

(73) Assignee: CANVA PTY LTD, Surry Hills (AU)

( * ) Notice: Subject to any disclaimer, the term of this patent is extended or adjusted under 35 U.S.C. 154(b) by 200 days.

(21) Appl. No.: 17/797,517

(22) PCT Filed: Feb. 5, 2021

(86) PCT No.: PCT/AU2021/050090
§ 371 (c)(1),
(2) Date: Aug. 4, 2022

(87) PCT Pub. No.: WO2021/155438
PCT Pub. Date: Aug. 12, 2021

(65) Prior Publication Data
US 2023/0206523 A1    Jun. 29, 2023

(30) Foreign Application Priority Data
Feb. 6, 2020 (AU) ................................. 2020900319

(51) Int. Cl.
G06T 11/40     (2006.01)
G06F 3/04845   (2022.01)

(52) U.S. Cl.
CPC .......... *G06T 11/40* (2013.01); *G06F 3/04845* (2013.01)

(58) Field of Classification Search
None
See application file for complete search history.

(56) References Cited

U.S. PATENT DOCUMENTS

| | | | |
|---|---|---|---|
| 2008/0141123 A1 | 6/2008 | Kitada | |
| 2011/0280476 A1* | 11/2011 | Berger | H04N 1/393 382/163 |
| 2015/0066681 A1* | 3/2015 | Jones | E04H 13/003 705/26.5 |
| 2015/0193957 A1* | 7/2015 | Dilts | G06T 11/60 345/634 |
| 2016/0378718 A1* | 12/2016 | Jarroush | G06F 40/18 715/229 |

FOREIGN PATENT DOCUMENTS

| | | | |
|---|---|---|---|
| CN | 104599271 A | 5/2015 | |
| WO | WO-2004111868 A2 * | 12/2004 | G06F 17/212 |

OTHER PUBLICATIONS

Written Opinion for International Search Report for PCT/AU2021/050090 mailed on Feb. 26, 2021.

* cited by examiner

*Primary Examiner* — Tapas Mazumder
(74) *Attorney, Agent, or Firm* — GrowIP Law Group LLC (57) ABSTRACT

Described herein is a computer implemented method for automatically recolouring a design element in a document. The method comprises determining a set of candidate colours, the set of candidate colours comprising one or more candidate colours; selecting a recolouring colour from the set of candidate colours; and recolouring the design element using the recolouring colour.

19 Claims, 6 Drawing Sheets

SYSTEMS AND METHODS FOR AUTOMATICALLY ADJUSTING DESIGN ELEMENT ATTRIBUTES

CROSS-REFERENCE TO RELATED APPLICATIONS

This application is a U.S. National Stage Application that claims the benefit of the filing date of International PCT Application No. PCT/AU2021/050090, filed on Feb. 5, 2021, that in turn claims priority to Australian Patent Application No. 2020900319, filed on Feb. 6, 2020, which are hereby incorporated by reference in their entirety.

FIELD OF THE INVENTION

The present disclosure is directed to systems and methods for automatically adjusting design element attributes.

BACKGROUND OF THE INVENTION

Many tools exist which provide functionality for creating and publishing designs. One example is the tool provided by Canva Pty Ltd.

In order to create designs, tools such as these (inter alia) allow users to access element libraries and add elements from those libraries to the design being created. Many different types of elements can be accessed, such as simple geometric shapes, images, vector graphics, videos, animations, and other types of elements.

In the context of the present application, elements have associated attributes that dictate various aspects of their appearance. The particular attributes for a given element depend on the type of element. By way of example, however, element attributes a vector graphic type element can include attributes such as line colour, fill colour, scale, orientation, and many other attributes.

A given design element is typically made available with a set of default attribute values. These provide the element with a default appearance, both when the user is searching for elements (e.g. in element libraries) and when it is added to a design. While an element's default appearance provides users with an idea of how the element may appear when added to a design, the default appearance will rarely (if ever) be appropriate for the final design. For example, a given element may have a colour attribute having a default value of grey. This provides users with an indication of how the element will appear in a relatively neutral way, but grey will rarely be the desired colour for the element once included in a design.

In many cases, selecting a final design value for a given attribute of a given element can be a difficult and time-consuming task. This is particularly the case where an element attribute has a large number of potential values. Again using colour as an example, the RGB colour space defines around 16.5 million colours. Furthermore, a given design element may have several colour attributes (e.g. a line colour, a fill colour, a shadow colour).

Background information described in this specification is background information known to the inventors. Reference to this information as background information is not an acknowledgment or suggestion that this background information is prior art or is common general knowledge to a person of ordinary skill in the art.

SUMMARY OF THE INVENTION

Described herein is a computer implemented method for automatically recolouring a design element in a document, the method comprising: determining a set of candidate colours, the set of candidate colours comprising one or more candidate colours; selecting a recolouring colour from the set of candidate colours; and recolouring the design element using the recolouring colour.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION OF THE EMBODIMENTS

In the following description numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

As described above, the present disclosure is generally concerned with software tools for creating graphic designs. One example of such a tool is the service provided by Canva.

Graphic design tools such as these typically allow users to access one or more libraries of design elements. Via one or more user interfaces, a user can search library elements (e.g. by browsing and/or running search queries), view element previews, and add elements to a design being created.

As also noted above, design elements have attributes that define their appearance. The library versions of elements are provided with initial or default attribute values that, unless changed, dictate the appearance of the element when previewed and initially added to a design.

The present disclosure provides systems and methods for automatically adjusting design element attributes, for example colour attributes.

Terminology

For ease of reference, the following is an explanation of terms used in this disclosure.

Design Document

A design document (also simply referred to as a "document") is a term to refer to a design as a whole.

A document comprises one or more pages to which design elements can be added. A document may have metadata about the document such as type, owner, and other metadata.

Page

A page is a section of a design document (similar conceptually to a page in a book) that shares some or all of the same metadata as the document.

A page also has its own metadata, for example page dimensions and a list (or other record) of elements that have been added to the page.

Design Creation Interface

A design creation interface is an interface for creating a design.

In the present disclosure, the design creation interface enables users to select and place design elements on to a page of the document. One example of a design creation interface is described with reference to FIG. 3, though many alternative design creation interfaces are possible.

Design Elements

Design elements are components that can be added to a document, edited (such as changing colours or filtering), oriented (including flipping or rotating), scaled (e.g. enlarged or shrunk), and positioned in three dimensions (e.g. an x-y position and a depth index).

Various different types of design elements can be provided. For example, a given design element may be a graphic, a shape, a sticker, an animation, text, a video, or other type of element. Furthermore, design elements may have different file formats. By way of example, a graphic design element may be in a .jpeg format, a .png format, a .bmp format, a .svg format, or an alternative graphic format.

Design Element Attributes

Each design element has design element attributes which define the appearance of an element on a page.

By way of example, attributes may include: x-y coordinates (e.g. the horizontal/vertical coordinate of a top left corner of the element on the page); rotation information (indicating a degree of rotation of the element); width information (indicating a width of the element); height information (indicating a height of the element); one or more colour attributes (indicating colours of different element aspects—e.g. a line colour, a fill colour, a shadow colour); and other attributes.

A design element added to a page is also associated with a depth which is used to determine whether a design element is behind or in front of one or more other design elements. Unless transparent, a design element that overlaps another design element will occlude that design element where the overlap occurs. Depth information in respect of design elements can be captured/recorded in various ways.

By way of example, in certain implementations an element's depth is implicitly maintained by recording elements added to a page in an ordered data structure—e.g. a page element list. As elements are added to a page they are (absent user instruction otherwise) added to the end of the data structure. In this case position of an element in the data structure allows depth information to be implicitly maintained: e.g. the first element of a page (typically a background element) takes index position 0 in the page element list indicating is the rearmost/deepest element of the page. Subsequent elements added to the page are sequentially added to the end of the list—i.e. index position 1 for the next element, index position 2 for the next and so forth. Any element stored at a list location having a higher index could therefore (depending on position and dimensions) partly or wholly occlude elements stored at locations with lower indices. Where depth is implicitly stored in this manner, if a user changes the depth of an element (e.g. by bringing forward, sending backwards, bringing to front, sending to back) corresponding changes are made to the order of the page element list.

In alternative implementations, depth can be stored in an explicit depth variable associated with an element.

While some attributes may be common across all elements, other attributes for a given element depend on its type. For example a text element may have different attributes to a graphic element.

Default attribute values are values defining a default appearance of an element. Absent any adjustment, the default appearance is the appearance of the element when being previewed (e.g. in an element preview/selection interface) and when initially added to a page. As described below, certain embodiments described herein operate to alter the default appearance of an element, either in a preview version thereof and/or once the element has been added to a page.

Networked Environment

Figure 1:
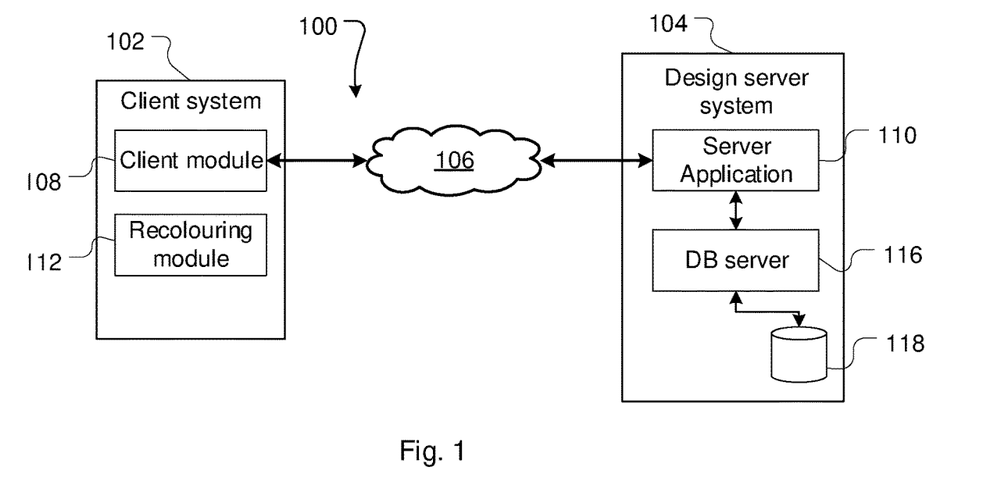
FIG. 1 is a block diagram illustrating an example environment in which features of the present disclosure can be implemented.

FIG. 1 depicts one example of a networked environment 100 in which the various operations and techniques described herein can be performed.

Networked environment 100 includes client system 102 and a design server system 104. While a single client system 102 has been shown server system 104 will typically service numerous client systems.

A client system 102 hosts a client module 108, which, when executed by the client system configures the client system 102 to provide client-side functionality/interact with the design server system 104 (or, more specifically, a server application 110, and a database server 116 with database 118 operating therein).

The client system 102 also hosts a recolouring module 112 that, in the described embodiments, performs many of the recolouring operations.

A client module 108 may be a general web browser application (such as Chrome, Safari, Internet Explorer, Opera, or an alternative web browser application) which accesses the server application 110 via an appropriate uniform resource locator (URL) and communicates with the server application 110 via general world-wide-web protocols (e.g. http, https, ftp). In some embodiments, a given client module, is a specific application rather than a general web browser application. Therefore, a client module may be a specific application programmed to communicate with the server application 110 using defined API calls.

A given client system 104 may have more than one client module 108, for example both a general web browser application and a dedicated programmatic client module The client module may comprise an additional specific module (not illustrated) similar to design module 112 which handles the design construction on the client-side for communication to the server application 110.

Design server system 104 hosts a server application 110. The server application 110 is executed by the design server system 104 to configure it to provide server-side functionality to the corresponding client module 108. The server application 110 comprises one or more application programs, libraries, APIs or other software elements that configure the server to implement the features and functions that are described herein.

Design server system 104 includes additional server-side resources which are used/accessed by the server application 110 to process and respond to communications during the design and render phases. A given server side resource may run on the same computer processing system as the server application 110 or on a different computer processing system (and be in communication with the server application 110 via a direct or networked communication channel).

By way of example, server-side resources in the design server system 104 include a database server 116 and a data store 118, which together provide access to data or services relevant to the services being offered by the server application 110.

The server application 110 may be a web server (for interacting with web browser clients) or an application server (for interacting with dedicated application clients).

While single server architecture has been described herein, it will be appreciated that the design server system 104 can be implemented using alternative architectures. For example, in certain cases a clustered architecture may be used where multiple server computing instances (or nodes) are instantiated to meet system demand.

Where the server system 104 includes multiple computer systems on which the server application 110 and resources run, those computer systems may be physically co-located and/or in different physical locations. Similarly, the computer systems on which the server application 110 and resources run may be on a common network (e.g. a local area network) or on different networks (in communication with each other via a network such as the Internet). Relevantly, the server application 110 can communicate with the resources in order to respond to communications it receives from the client system 102.

The client system 102 and server application 110 communicate data between each other either directly or indirectly through one or more communications networks 106. Communications network 106 may comprise a local area network (LAN), a public network, or a combination of networks.

Client system 102 may be any device suitable for performing client-side operations described herein for example a mobile device (e.g. a tablet or mobile phone), a portable device (such as laptop computer), or any other computing device (e.g. a desktop computer). Generally speaking, users of client system 102 are associated with one or more user accounts and interact with the design server system 104. This interaction may include any type of user account interaction with the design server system 104, including interaction with content and/or software application(s) hosted by the design server system 104. Example interactions include accessing/viewing and/or editing one or more design documents hosted by the design server system, creating new designs, publishing or previewing designs, etc.

In FIG. 1, the recolouring module is shown as part of (installed on) client system 102. In certain implementations, the recolouring module 112 is a native part of the client module 108: i.e. the client module 108 as installed includes instructions and data to perform the functions of the recolouring module 112. In alternative implementations, the recolouring module 112 is a plugin or add-on to the client module 108.

In still further implementations, the recolouring module 112 may be a server-side module (i.e. a module that executes on the design server system 104). This may be appropriate where the client module 108 is a generic web browser.

Generally speaking, operations described herein may be performed by a client module 108, the server application 110, or by a combination of client module 108 and the server application 110. For example, operations involving the creation of new designs may be performed by the client module 108. The data displayed, however, may be display data generated by the client module 108 itself, or generated by the server application 110 communicated to the client system 102.

Similarly, operations involving user input involve the client system 102 receiving user input and passing that input to the client module 108. The information input may be processed by the client module 108 itself, or communicated by the client module 108 to the design server system 104 to be processed by the server application 110.

Operations involving writing data to the data store 118 involve the database server 116. The data written to the data store 118 may, however, be communicated to the server application 110 from the client module 108.

As above, a client system such as 102 may be any computer processing system which is configured (or configurable) by hardware and/or software to offer client-side functionality. Similarly, server application 110 may be any computer processing system which is configured (or configurable) by hardware and/or software to provide server-side functionality. Other server-side resources (e.g. database server 116 and data store 118) will also be provided by/run on a computer processing system. Typically server systems are more powerful (from a computer processing perspective) than client systems but this is not necessarily the case. By way of example, suitable user (client) and/or server systems may include: server computer systems, desktop computers, laptop computers, netbook computers, tablet computing devices, mobile/smart phones, personal digital assistants, personal media players, set-top boxes, games consoles.

While a client server architecture has been provided by way of example, the techniques described herein could be used in a stand-alone application, that is one that does not use a server at all.

Computer Processing System

The present invention is necessarily implemented using one or more computer processing systems.

Figure 2:
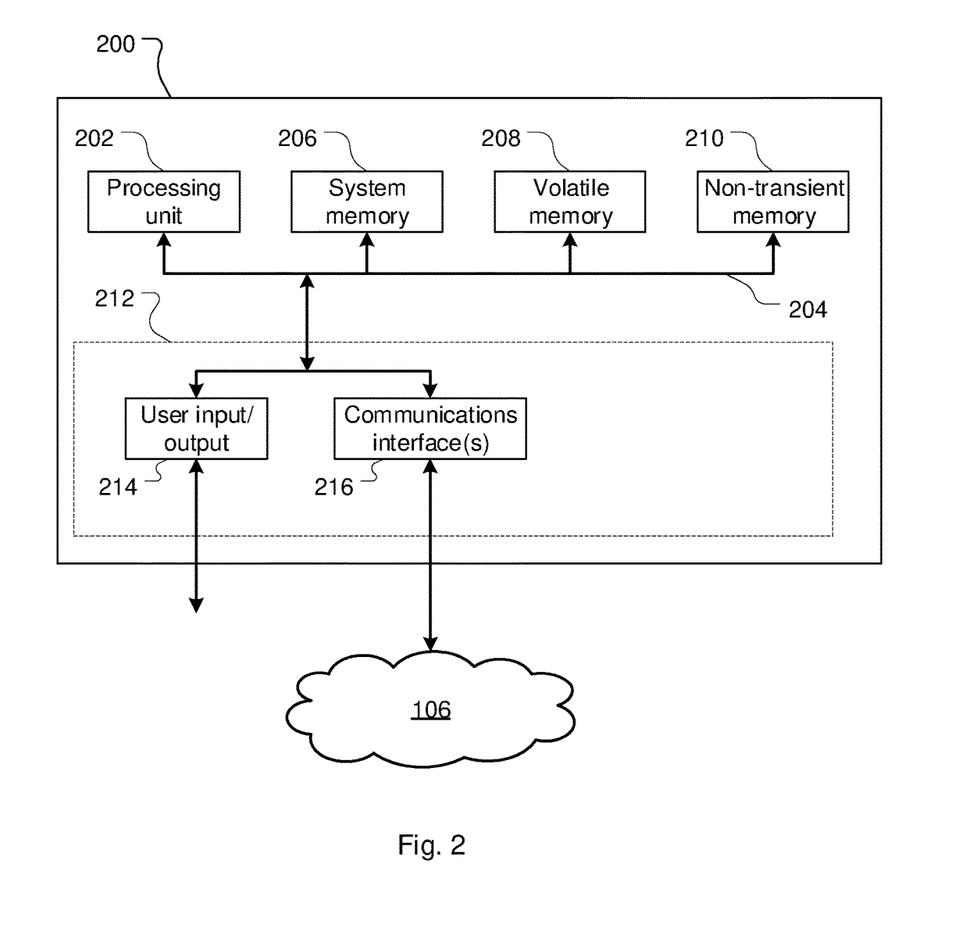
FIG. 2 is an example computer processing system.

FIG. 2 provides a block diagram of one example of a computer processing system 200. Computer processing system 200 may, for example, be configured for use as (or in) the design server system 104, a client system (such as 102), or another server-side resource such as database server 116 or data store 118 as described above.

System 200 as illustrated in FIG. 2 is a general-purpose computer processing system. It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing aspects of the invention may have additional, alternative, or fewer components than those depicted, combine two or more components, and/or have a different configuration or arrangement of components.

The computer processing system 200 includes at least one processing unit 202. The processing unit 202 may be a single computer-processing device (e.g. a central processing unit, graphics processing unit, or other computational device), or may include a plurality of computer processing devices. In some instances all processing will be performed by processing unit 202, however in other instances processing may also, or alternatively, be performed by remote processing devices accessible and useable (either in a shared or dedicated manner) by the system 200.

Through a communications bus 204 the processing unit 202 is in data communication with one or more machine-readable storage (memory) devices that store instructions and/or data for controlling operation of the processing system 100. In this instance system 200 includes a system memory 206 (e.g. a BIOS), volatile memory 208 (e.g. random access memory such as one or more DRAM modules), and non-volatile memory 210 (e.g. one or more hard disk or solid state drives).

System 200 also includes one or more interfaces, indicated generally by 212, via which system 200 interfaces with various devices and/or networks. Generally speaking, other devices may be physically integrated with system 200, or may be physically separate. Where a device is physically separate from system 200, connection between the device and system 200 may be via wired or wireless hardware and communication protocols, and may be a direct or an indirect (e.g. networked) connection.

Wired connection with other devices/networks may be by any appropriate standard or proprietary hardware and connectivity protocols. For example, system 200 may be configured for wired connection with other devices/communications networks by one or more of: USB; FireWire; eSATA; Thunderbolt; Ethernet; OS/2; Parallel; Serial; HDMI; DVI; VGA; SCSI; AudioPort. Other wired connections are, of course, possible.

Wireless connection with other devices/networks may similarly be by any appropriate standard or proprietary hardware and communications protocols. For example, system 200 may be configured for wireless connection with other devices/communications networks using one or more of: infrared; Bluetooth; Wi-Fi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are, of course, possible.

Generally speaking, the devices to which system 200 connects—whether by wired or wireless means—allow data to be input into/received by system 200 for processing by the processing unit 202, and data to be output by system 200. Example devices are described below, however it will be appreciated that not all computer-processing systems will include all mentioned devices, and that additional and alternative devices to those mentioned may well be used.

For example, system 200 may include or connect to one or more input devices by which information/data is input into (received by) system 200. Such input devices may include physical buttons, alphanumeric input devices (e.g. keyboards), pointing devices (e.g. mice, track pads and the like), touchscreens, touchscreen displays, microphones, accelerometers, proximity sensors, GPS devices and the like. System 200 may also include or connect to one or more output devices controlled by system 100 to output information. Such output devices may include devices such as indicators (e.g. LED, LCD or other lights), displays (e.g. CRT displays, LCD displays, LED displays, plasma displays, touch screen displays), audio output devices such as speakers, vibration modules, and other output devices. System 200 may also include or connect to devices which may act as both input and output devices, for example memory devices (hard drives, solid state drives, disk drives, compact flash cards, SD cards and the like) which system 200 can read data from and/or write data to, and touch-screen displays which can both display (output) data and receive touch signals (input).

System 200 may also connect to communications networks (e.g. the Internet, a local area network, a wide area network, a personal hotspot etc.) to communicate data to and receive data from networked devices, which may themselves be other computer processing systems.

It will be appreciated that system 200 may be any suitable computer processing system such as, by way of non-limiting example, a desktop computer, a laptop computer, a netbook computer, tablet computer, a smart phone, a Personal Digital Assistant (PDA). Typically, system 200 will include at least user input and output devices 214 and (if the system is to be networked) a communications interface 216 for communication with a network (e.g. network 106 of FIG. 1). The number and specific types of devices which system 200 includes or connects to will depend on the particular type of system 200. For example, if system 200 is a desktop computer it will typically connect to physically separate devices such as (at least) a keyboard, a pointing device (e.g. mouse), a display device (e.g. a LCD display). Alternatively, if system 200 is a laptop computer it will typically include (in a physically integrated manner) a keyboard, pointing device, a display device, and an audio output device. Further alternatively, if system 200 is a tablet device or smartphone, it will typically include (in a physically integrated manner) a touchscreen display (providing both input means and display output means), an audio output device, and one or more physical buttons.

System 200 stores or has access to instructions and data which, when processed by the processing unit 202, configure system 200 to receive, process, and output data. Such instructions and data will typically include an operating system such as Microsoft Windows®, Apple OSX, Apple IOS, Android, Unix, or Linux.

System 200 also stores or has access to instructions and data (i.e. software) which, when processed by the processing unit 202, configure system 200 to perform various computer-implemented processes/methods in accordance with embodiments as described below. It will be appreciated that in some cases part or all of a given computer-implemented method will be performed by system 200 itself, while in other cases processing may be performed by other devices in data communication with system 200.

Instructions and data are stored on a non-transient machine-readable medium accessible to system 200. For example, instructions and data may be stored on non-transient memory 210. Instructions may be transmitted to/received by system 200 via a data signal in a transmission channel enabled (for example) by a wired or wireless network connection.

Design Creation and Editing

In the embodiments described herein, client module 108 configures a client system 102 to provide a design creation user interface. Via this interface a user can create a design document that comprises one or more pages and (inter alia) add elements to the page.

Figure 3:
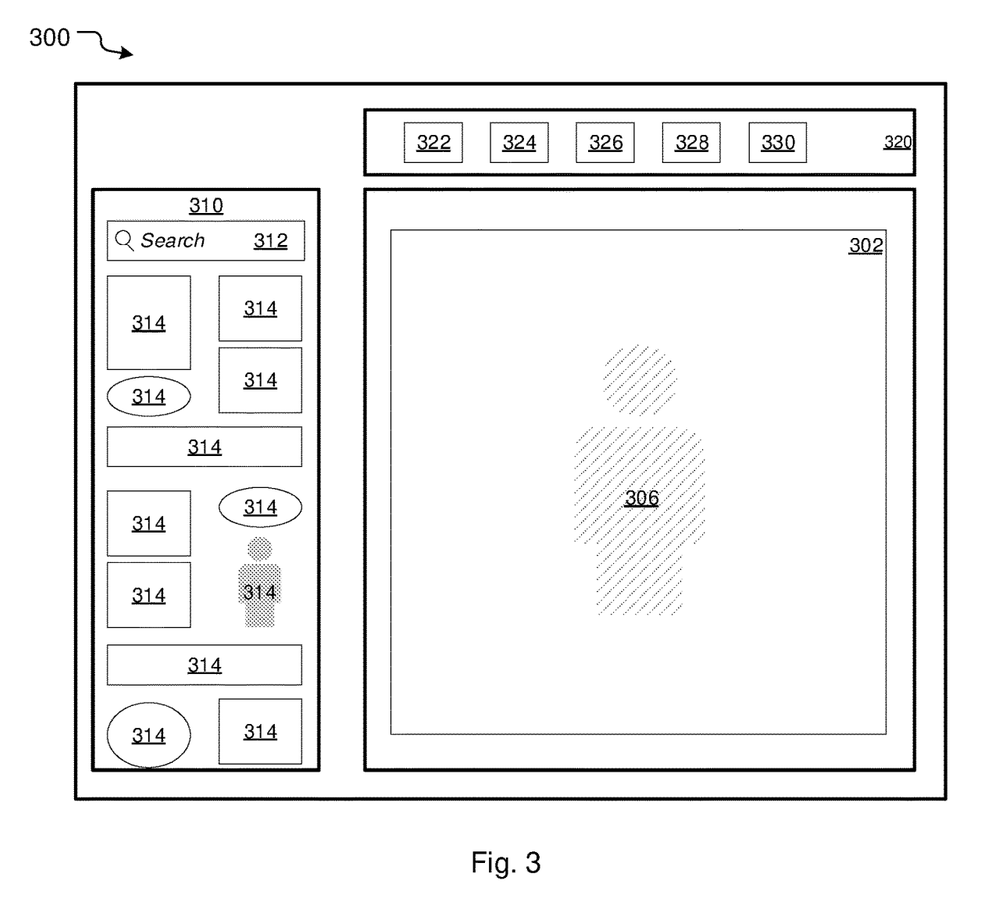
FIG. 3 is depiction of a design creation user interface.

FIG. 3 provides a depiction of a design creation user interface 300. Interface 300 includes only user interface elements relevant to the present disclosure, and it will be appreciated that such an interface would typically include additional UI elements to those depicted.

Example design creation interface 300 includes a design creation pane 302. This is the pane that shows the design currently being created. In the present example, design creation pane 302 shows a single page 304 of a design document (and a single design element 306 that has been added to the document).

Design creation interface 300 also includes a design element search and selection pane 310 via which a user can search or browse one or more design element libraries, view design element previews 314, and select design elements to be included in the design document. To this end, pane 310 includes a search box 312 (allowing in this case a user to enter search text) and design element previews 314 providing preview images of design elements.

Design creation interface 300 also includes a toolbar 320 providing various tools for the user to use in creating the design. In this particular example the tools include: an element selection tool 322 allowing a user to select a particular design element; a drawing tool 324 allowing a user to draw a design element having a geometric or other shape; a text tool 326 allowing a user to a textual design element; a colour tool 328 allowing a user to manually adjust one or more colours of a given design element; an import tool 330 allowing a user to import an element from another source (e.g. an element stored on locally or remotely accessible memory, an element from a third party server, etc.).

While not shown, toolbar 320 will typically be an adaptive toolbar in that the tools provided change depending on what the user is doing. For example, if a user selects the text tool 326 additional (or alternative) tools relevant to text may be displayed: e.g. a font selection tool and a text size tool.

Generally speaking, in order to create a design a user creates a page and adds design elements to that page. Design elements can be added in various ways. For example, a user can interact with the design element search and selection pane 310 to search/browse for design elements and then add elements to the design being created—e.g. by selecting a design element preview 314, dragging it to a position on the page 304, and dropping it. Alternatively, a user may create and add an entirely new element—e.g. by drawing an element using a tool such as drawing tool 324 or adding custom text via text tool 326. Further alternatively, a user may import an element via import tool 330.

Once an element has been added to the page it becomes an included design element 306 and the user can interact further with it—e.g. by moving it around the page, changing its depth (e.g. bringing forward, moving backward, bringing to front, moving to back), moving it to another page of the document, resizing it, changing its rotation, flipping it about an axis, manually adjusting colours, deleting it, duplicating it, etc.

Design Element Recolouring

The present disclosure provides techniques for automatic design element recolouring—i.e. automatically adjusting the default values of one or more colour attributes of a design element.

Recolouring a design element using the techniques described herein (or adaptations thereof) may provide various advantages. For example, where a preview of a design element is recoloured (that is a version of the design element shown in an element search/selection user interface or the like) it may provide a user with a better understanding of how the design element could fit in with the design being created than if the design element was shown in its default colour(s). As another example, when a user adds a design element to a page, displaying the element with adjusted colour(s) may remove the need for a user to make any further colour adjustments or simplify any adjustments the user does wish to make (as a starting colour other than the element's default colour has been provided).

In the described embodiments, the processing involved in recolouring a design element is described as being performed by a recolouring module 112. As noted above, while recolouring module 112 has been depicted as a client-side module (running on client system 102), it could be implemented as a server-side module (running on server system 104)—or, indeed, as a split module with some processing performed client side and some performed server-side.

Generally speaking, the recolouring module 112 is configured to determine whether a design element being added to a page can and should be recoloured. If so, the recolouring module 112 determines one or more candidate colours that could be used to recolour the design element and then selects a candidate colour (or colours) to do so.

Figure 4:
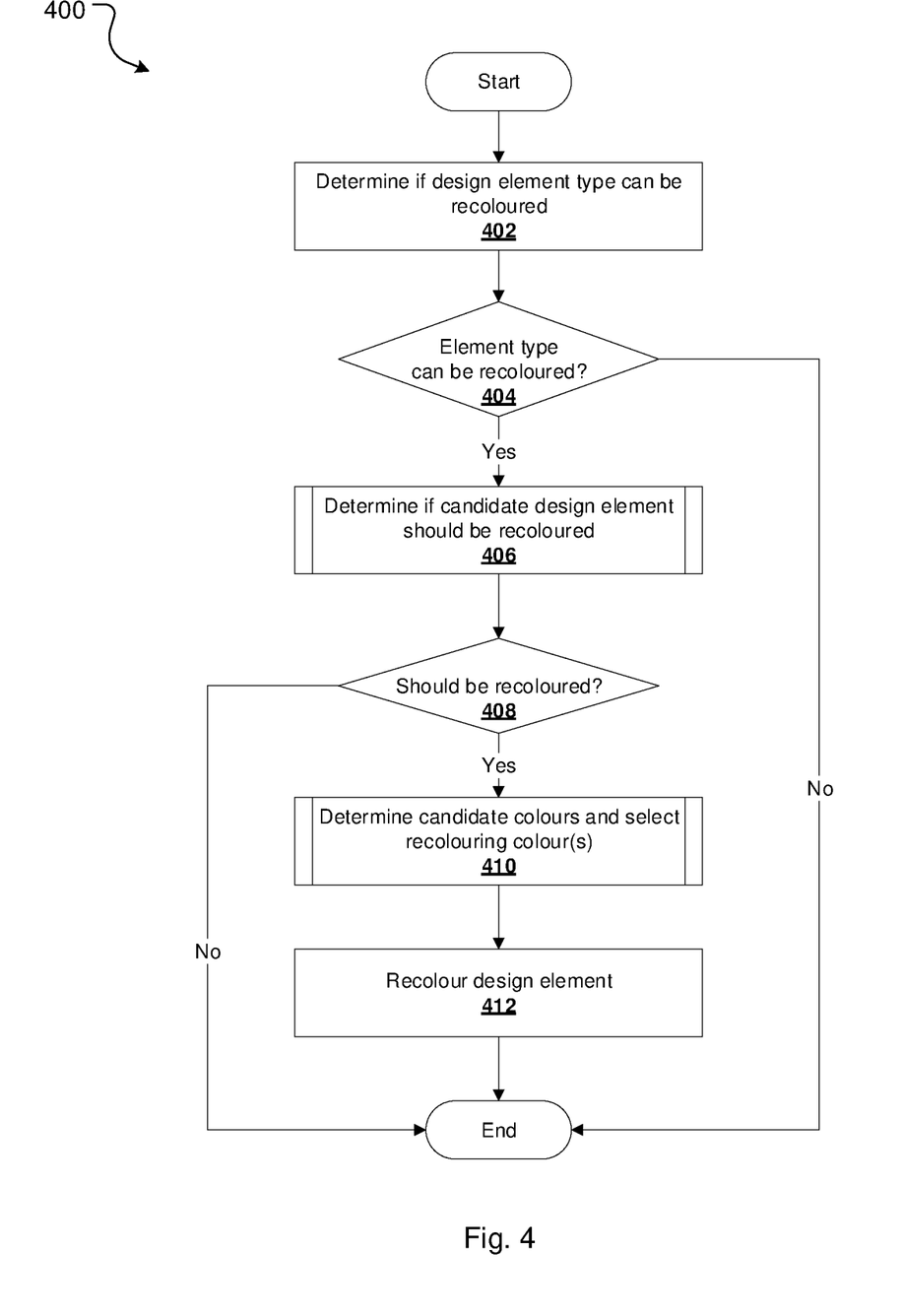
FIG. 4 is a flowchart depicting operations involved in an example process for recolouring design elements.

An example design element recolouring process 400 will be described with reference to FIG. 4.

Design recolouring process 400 may, for example, be triggered when a user adds a design element to a design page (e.g. by dragging a preview 314 to the page 304, importing a design element, or otherwise adding a design element to the page).

At 402, the recolouring module 112 determines whether the design element is of a type that can be recoloured by the recolouring module 112. By way of example, the recolouring module 112 may be configured to ignore any video type design elements as design elements that cannot be recoloured. As another example, the recolouring module 112 may be configured only to determine that a design element can be recoloured if it is of a certain type. For example, vector graphic elements (such as scalable vector graphic (SVG) elements), shape elements, cells within grids/tables, charts, lines, icons, text, and page backgrounds may all be recolourable element types.

At 404, if the recolouring module 112 determines that the design element type cannot be recoloured processing for the design element ends. In this case the element in question is displayed in its original/default colours. Otherwise, processing continues to 406.

At 406, the recolouring module 112 determines if the design element should or will be recoloured. The recolouring module 112 can be configured to take various factors into account when determining whether a design element should/will be recoloured, examples of which are described further below with reference to FIG. 5.

To further explain the distinction between design elements that can/cannot be automatically recoloured (as determined at 402) and design elements that should/should not be automatically recoloured (as determined at 406), consider a design element that is a photograph image. In certain embodiments, the recolouring module 112 may be configured so that it can recolour such design elements (e.g. by applying a colour filter or other recolouring mechanisms). As discussed below, however, for certain photograph images the recolouring module 112 may determine that a particular photograph should not be recoloured. This is on the basis that, for example, while a photo of a person could be automatically recoloured it is unlikely that doing so is desirable.

At 408, if the recolouring module 112 determines that the design element should not be recoloured, processing for the design element ends. Otherwise, processing continues to 410.

At 410, the recolouring module 112 determines one or more candidate colours that could potentially be used to recolour the design element then selects one or more recolouring colours from the candidate colours to recolour the design element with. The recolouring module 112 can determine candidate colours and select recolouring colours in various ways as is described in further detail below with reference to FIG. 6.

At 412, the recolouring module 112 recolours the design element (or design element preview) using the selected recolouring colour(s). Generally speaking, this involves writing identifier(s) of the selected colour(s) to the appropriate design element attribute(s) and displaying the design element in the selected colour(s).

Determining if a Design Element should be Recoloured

Figure 5:
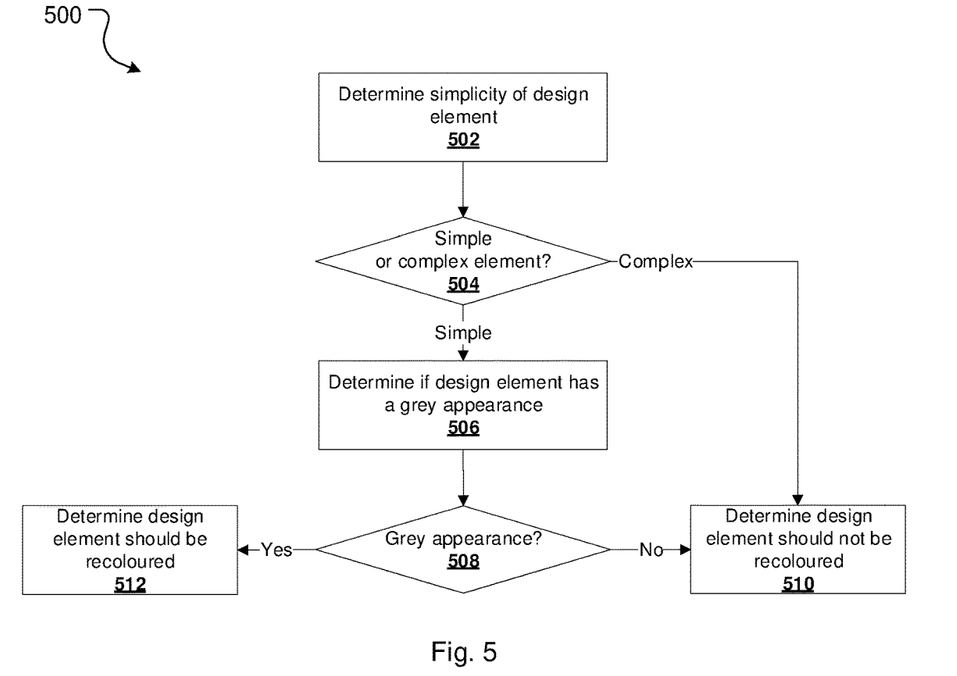
FIG. 5 is a flowchart depicting operations involved in an example process for determining whether a given design element should be recoloured.

Example operations involved in determining whether a design element should be recoloured (per 406 of FIG. 400) will described in more detail in reference to FIG. 5.

At 502, the recolouring module 112 determines whether the design element is what will be referred to as a simple design element or a complex design element.

In this context, simplicity/complexity is a measure of how simple or complex the design element is in terms of the amount of colour information it has. Based on this, the recolouring module 112 is configured to make a determination as to how desirable or otherwise recolouring an element is. For example, a design element that is a colour photograph will typically have a large number of colours and be a complex element. In contrast, a design element that is an icon or shape will typically have a relatively low number of colours and be a simple element. As noted above, while automatically recolouring an icon/shape design element (e.g. a simple element) may be desirable, automatically recolouring a colour photograph design element (e.g. a complex element) typically will not be.

Determining simplicity/complexity of a design element can be performed in various ways, for example by consideration of factors such as how many distinct colours the design element has and/or the size of the file that includes the data for the selected design element.

For example, the recolouring module 112 may determine the number of distinct colours used in a design element and compare this against a threshold number of colours (e.g. 2, though alternative thresholds can be used). If the number of distinct colours in a design element exceeds the threshold the design is determined to be a complex design element. If not, the design element is determined to be a simple design element.

As another example, the recolouring module 112 may be configured to determine a compressed size of the design element and compare this to a threshold size. For example, the recolouring module 112 can may be configured to rasterise the selected design element and then compress the resulting image using a compression algorithm (e.g. a PNG, JPEG or other compression algorithm). If this process produces a compressed file having a file size below a specified size threshold (e.g. 10 kilobytes, though alternative thresholds can be used), the recolouring module 112 determines the design element to be a simple design element. If not the design element is determined to be a complex design element.

As a further alternative, the recolouring module 112 can be configured to determine simplicity by reference to both the number of colours and a compressed file size. For example, the recolouring module 112 can be configured to assign each of these factors a weighting, which is then used to calculate a single simplicity score. The single simplicity score can then be compared against a threshold score: if it is less than the threshold score it is determined to be a simple design element, if not a complex design element.

If, at 504, the recolouring module 112 determines the design element to be a complex design element the determination is made at 510 that the design element should not be recoloured. If the recolouring module 112 determines the design element to be a simple design element processing proceeds to 506.

At 506, the recolouring module 112 determines if the design element has a predominantly grey appearance. Grey is often used as a default colour setting for images that are intended to be recoloured (and grey does not typically appear in large amounts in designs or design elements created by users). Accordingly, if the recolouring module 112 determines the design element to have a predominantly grey appearance the element is determined to be suitable for recolouring (provided no other factors lead to an alternative determination).

The recolouring module 112 may be configured to determine whether a design element has a grey appearance in various ways.

For example, the recolouring module 112 may determine whether a design element has a grey appearance by consideration of its chromaticity.

Chromaticity is an objective measure of a colour, independent of luminance. Some colour spaces, such as Red Green Blue (RGB) colour space, do not separate out chromaticity. Accordingly, design elements that make use of such a colour space can be converted into an alternative colour space that does provide chromaticity information, such as the Luminance Chroma Hue (LCH) colour space or the Hue Saturation Value (HSV) colour space. In the HSV colour space, chromaticity can be measured by two parameters: hue and saturation (alternatively referred to as colourfulness). In some embodiments, the recolouring module 112 can measure chromaticity by taking the RGB value of each colour of a component in the selected design element and converting to an LCH value in LCH colour space.

In order to determine whether a design element has a predominantly grey appearance or not, the recolouring module 112 then determines if the LCH value of all recolourable components in the design element are below a chroma threshold. If so, the design element is determined to have a predominantly grey appearance. If one or more recolourable components of the design element is greater than or equal to the chroma threshold the design element is not determined to have a predominantly grey appearance. The appropriate threshold will depend on the manner in which image data is processed (e.g. converted from sRGB into LCHab). By way of example, however, a chroma threshold of 20 may be appropriate for certain sRGB to LCHab conversion algorithms and a reference white value of D50 is used for LAB.

If, at 508, the recolouring module 112 determines the design element does not have a predominantly grey appearance, the determination is made at 510 that the design element should not be recoloured. If the recolouring module 112 determines the design element does have a predominantly grey appearance, the determination is made at 512 that the design element should be recoloured.

While process 500 has been described as a linear process it will be appreciated that this need not be the case. For example, determining the simplicity of a design element (at 502/504) and the grey appearance of a design element (at 506/508) could be performed in the opposite order or in parallel. Furthermore, in certain implementations the recolouring module 112 may be configured only to consider one or the other of element simplicity/grey scale appearance in determining whether a design element should be recoloured.

Still further, in alternative implementations the recolouring module 112 may be configured to take additional and/or alternative considerations into account when determining whether a design should be recoloured.

For example, the manner in which a design element has historically been used by other users may be used in the determination as to whether a design element should be automatically recoloured or not.

Certain design elements may be made available to many (or all) users of the design system (e.g. via design element libraries). In this case, the server application 110 can be configured to monitor and record the manner in which design elements are used. In particular, the server application 110 can, for a given design element, monitor: whether it is typically manually recoloured by users or not; and/or, for a design element that is automatically recoloured, whether a user typically accepts recolouring of the element or rejects automatic recolouring/manually changes the element back to its initial/default colours.

Based on this data, a determination can be made as to whether a design element should be recoloured—for example based on a statistical analysis of historical usage to generate a prediction of how likely it is that a given design element will be recoloured. Such an analysis may take into account factors such as: the total number of times a design element has been used; the number of different users that have used the design element; the number of times the design element has been recoloured (or reverted to initial/default colours after being automatically recoloured); the number of times unique users of the element have recoloured the element (or reverted to initial/default colours after being automatically recoloured); where a design element has been recoloured, which components of the design element were recoloured (such as the outline, fill etc.).

Data analysis such as this will typically be performed server-side (e.g. by the server application 110 based on usage data stored in the data store 118). If the server application determines that a design should not be automatically recoloured based on historical usage data it can inform the client module 108 of this—for example by use of a flag or other variable associated with the design element indicating it should not, based on historical usage data, be recoloured.

Where the recolouring module 112 is configured to take multiple considerations into account in determining whether a design should be recoloured, each consideration may be treated independently (as described above with reference to FIG. 5). Alternatively, the different considerations may be combined together to give a final recolouring score, and the determination as to whether a design should be recoloured then based on that final recolouring score. For example, each of the different factors that are considered (e.g. colour complexity, grey appearance, and/or any other factors considered) may generate an individual recolouring factor score. The recolouring factor scores can then be combined (in a weighted or non-weighted way) to generate a final recolouring score.

Determining Candidate Colours and Selecting Colour(s) for Recolouring

Once the recolouring module 112 has determined that a design element can and should be recoloured (at 404 and 408 respectively), the recolouring module 112 determines candidate colours that could be used to recolour the design and selects one or more of those candidate colours to do so.

Determining candidate colours can be performed in various ways. One example process for doing so will be described with reference to FIG. 6.

Figure 6:
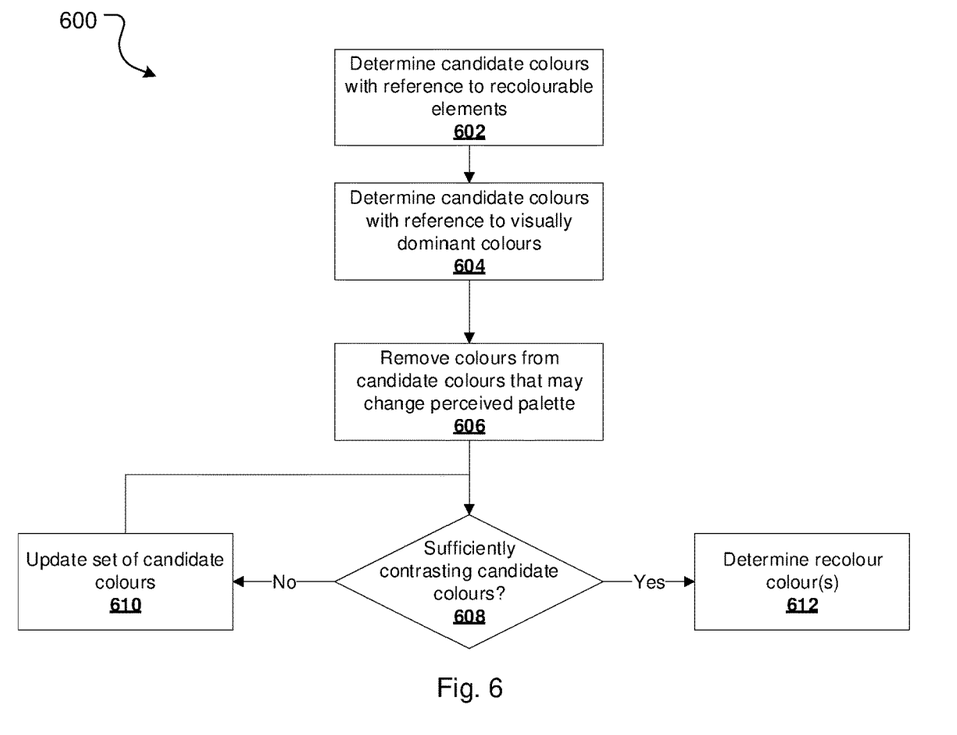
FIG. 6 is a flowchart depicting operations involved in an example process for selecting one or more colours to recolour a design element.

At 602, the recolouring module 112 determines candidate colours based on the colours of any recolourable design elements that have already been added to the document. In this context a recolourable design element is one with specific colour attributes (e.g. a line colour attribute, text colour attribute, fill colour attribute, and/or other colour attribute.) Such elements will typically be vector graphics. This is in contrast to design elements that do not have specific colour attributes (e.g. a jpeg image file or the like). Elements without specific colour attributes may still be coloured elements, and can potentially be recoloured (e.g. by applying a colour filter or manipulating other file data), but do not have explicit colour attributes such as those of a vector graphic.

In the present example, therefore, at 602 the recolouring module 112 analyses the recolourable design elements that have been added to the document to determine the colour or colours that have been used in those design elements. The colours used in the recolourable design elements are then added to a set of candidate colours (e.g. a candidate colour list). It should be noted that this process can occur even if recolourable design elements added to a document have not actually been recoloured. For example, a recolourable design element may have default colours associated with its recolourable component(s) that the user has not changed.

In alternative embodiments, the recolouring module 112 can determine the colours of recolourable design elements on the specific page to which the design element in question is being added. In this case, such colours can at least initially be prioritised over colours of recolourable design element used on other pages in the document.

At 604, the recolouring module 112 determines any visually dominant colours present in the page to which the element is being added and updates the set of candidate colours to include these.

The recolouring module 112 can determine the visually dominant colours of the page in question by, for example, rasterizing the page then using a clustering algorithm, such as a K-means clustering algorithm, on the page pixels (generated by the rasterizing process). Generally speaking, the clustering algorithm will operate to create clusters of similarly coloured pixels. Each cluster generated can then be assigned a colour, for example by averaging the colours of the pixels falling within that cluster, and each cluster colour added to the list of candidate colours. The clustering algorithm in relation to colours is discussed in more detail in FIG. 9.

At 606, the recolouring module 112 determines whether any colour currently included in the set of candidate colours would, if used to recolour a design element, be likely to change the perceived colour palette of the page (or the document as a whole if this determination is made on a document basis). Any such candidate colours are removed from the list of candidate colours. This determination can be made, for example, by mapping each colour in the set of candidate colours and, for each candidate colour, determining whether that particular candidate colour is sufficiently close to any of the visually dominant colours used in the page (as determined at 604). If a given candidate colour is determined not to be sufficiently close to any of the visually dominant colours it is removed from the set of candidate colours.

Various approaches can be used to determine whether one colour (e.g. a particular candidate colour) is sufficiently close to another (e.g. a visually dominant colour). In most commonly used colour spaces, each colour can be represented as a coordinate in three dimensional space. For example, the coordinates (100, 60, 25) in RGB colour space represent a coordinate of 100 red, 60 green and 25 blue. Similar coordinates can be determined for a colour in other colours spaces such as LAB or LCHab. In certain embodiments the recolouring module 112 is configured to calculate the Euclidian distance between colours to determine proximity. If a given candidate colour is not within a threshold colour distance of at least one visually dominant colour it is removed from the candidate colours (on the basis that it could change the document's perceived palette). As one example a threshold colour distance of 40 may be used, though alternative thresholds are possible.

At 608, the recolouring module 112 determines if any of the current candidate colours are sufficiently contrasting to be used to recolour the design element. In the present embodiment, the recolouring module 112 makes this determination with reference to luminance contrast and colour distance (as described above).

Contrast can be defined as a difference in luminance or colour that makes an object such as the design element distinguishable. Therefore a design element that is recoloured with a colour having a low level of contrast (or, at least, has an outline recoloured with such a colour) may end up indistinguishable or difficult to distinguish from the underlying page.

Determining whether a candidate colour is sufficiently contrasting can be calculated before the selected design element is placed (that is, added to a page) or positioned (that is, added to a page at, or moved around a page to, a specific position) by taking into account contrast with the visually dominant colours of the page and colour distance between the candidate colour and either the visually dominant colours of the page. For example, if a page has both red and blue candidate colours, but red is a visually dominant colour of the page, then using red to recolour the design element (or, at least, an outline or other attribute thereof) may not provide the element with sufficient contrast from the rest of the page. This approach is also suitable where design element previews are being recoloured, as discussed below.

Alternatively (or additionally), determining whether a candidate colour is sufficiently contrasting can be calculated after the selected design element is added to (and positioned on) the page. In this case, the recolouring module 112 may determine whether a given candidate colour is sufficiently contrasting to and distant from one or more element bordering colours: i.e. one or more colours of a region of the page that borders the area of the page the design element will occupy. By way of example, the recolouring module 112 may be configured to calculate the element bordering colours as the colours in a defined border region surrounding the design element's position and determine whether a given candidate colour is sufficiently contrasting with reference to those colours. Determining whether a candidate colour is sufficiently distant from the element bordering colours can be performed by, for example, determining visually dominant element bordering colours (in the same or a similar manner to dominant colour determination described above) then determining whether the candidate colour is sufficiently distant from the dominant element bordering colours. The defined border region may, for example, be defined as a path that is a number of pixels wide (e.g. 20) surrounding the design element.

If there are no candidate colours that are sufficiently contrasting, at 610 the recolouring module 112 updates the set of candidate colours to include new colours. The recolouring module 112 can identify additional candidate colours in various ways.

For example, the recolouring module 112 can add less visually dominant colours to the set of candidate colours and/or create new colours to add to the set of candidate colours. Less visually dominant colours may be colours that were eliminated because they were not in the larger clusters of colours as defined above. Other less visually dominant colours include colours that are within a cluster but may be further in distance from the average of the cluster. Alternatively, new colours can be created by adjusting luminance of colours that have insufficient contrast or simply selecting new colours that contrast with (and are complementary to) one or more dominant colours of the page.

As a further example, if (at 602) the colours of recolourable elements were prioritised based on the usage in the page the element is being added to, the recolouring module can update the set of candidate colours to include colours from recolourable elements on other pages of the document.

As a further example, if (at 604) dominant colours were identified based on the particular page in question, the recolouring module can update the set of candidate colours to include dominant colours from the document as a whole (determined in a similar manner to described above, with the exception that all pages are taken into account).

Complementary colours can be determined, for example, by use of data structure (e.g. a colour wheel data structure or the like) that identifies colours that are complementary to a given colour.

Once the recolouring module 112 has updated the set of candidate colours the process then returns to 608 to determine if any of the newly added candidate colours are sufficiently contrasting.

Once the recolouring module 112 has determined that there is at least one sufficiently contrasting candidate colour, processing continues to 612. At 612, the recolouring module 112 determines one or more recolouring colours to recolour the design element with.

From a contrast perspective, and generally speaking, the most important component of a design element will be its outline. Consider, for example, placing a design element on an area of a page that is yellow: if yellow is selected as the outline of the design the outline will not be distinguishable; if, however, blue (a contrasting colour) is selected as the outline of the design element it may not matter what colour is selected as the fill (even yellow).

Accordingly, in the present example determining one or more recolouring colour(s) for a design element involves initially determining a recolouring colour for the outline of the design element (e.g. the line colour attribute of the design element). Where a design element only has one recolourable component (attribute) this will be treated as the outline of the design element.

If there is only one sufficiently contrasting candidate colour then this candidate colour is selected as the recolouring colour for the outline of the design element.

If there is more than one sufficiently contrasting candidate colour, then the recolouring module 112 determines which of the candidate colours to select as the recolouring colour for the outline. In some cases, the recolouring module 112 may select the candidate colour with the highest contrast or the candidate colour that is most dominant. In other cases, the recolouring module 112 may score the candidate colours according to a number of factors, including contrast, dominance, colour distance, and any previously recoloured design elements. The recolouring module 112 will then select the candidate colour with the highest score as the recolouring colour for the design element's outline.

In some cases a design element may have more than one colour component/attribute that can be recoloured (e.g. line colour, fill colour, etc.). In this case, the outline colour of the design element will typically be the recolouring colour that is initially determined at 612, as this is the colour that will effectively separate the design element being recoloured from the rest of the design elements on the page. Recolouring colours for other components of the design can then be identified.

By way of example, where a design element has an outline colour and a fill colour, the recolouring module can be configured to determine the recolouring colour for the outline as described above at 610. The recolouring colour for the fill can then be determined by selecting a second colour from the candidate colours that contrasts with (and is complementary to) the selected line colour. In this case, it may not matter if the second colour (used for the fill) is sufficiently contrasting with the rest of colours in the region of the page the element occupies or not, as the outline colour will distinguish the design element from the surrounding region of the page.

Once the recolouring colour(s) have been determined at 612, that/those colour(s) is/are used to recolour the design element (e.g. as at 412 described above).

In certain implementations, the design creation tool may allow for a design colour palette to be defined: i.e. a selection of colours that are either suggested for the design or enforced. This can be useful, for example, where the design creation tool is being used to create a number of designs for a particular brand and the person or team in charge of creating those designs wants to suggest or limit the colours that can be used in designs created for that brand. Where a design colour palette has been defined, this can be taken into account when determining candidate colours at 602. For example, instead of analysing design elements and/or determining visually dominant colours, the recolouring module 112 can instead use the colours defined by the design colour palette (or a selection thereof) as the candidate colours. Alternatively, the recolouring module 112 can perform the analysis of design elements/visually dominant colour determination as described above but: remove any colours that are not defined in the design colour palette; and/or add any colours in the design colour palette that are not identified in analysis of the existing design elements/determination of visually dominant colours.

Additional (and/or alternative) mechanisms for determining candidate colours to add to the set of candidate colours and/or determining colours to be removed from the set of candidate colours can be employed.

By way of example, at 602 as well as adding colours of recolourable elements to the set of candidate colours, the recolouring module 112 can be configured to also identify and add colours that are complementary to the colours of recolourable elements.

Similarly, at 604 the recolouring module 112 can be configured to also identify and add colours that are complementary to the dominant colours identified.

Process 600 is described above (and illustrated) as sequential process. In certain implementations, however, the recolouring module 112 is configured to maintain a record of visually dominant colours of a page (and/or document as a whole). For example, the recolouring module 112 can be configured to detect triggering of a colour change event and, in response thereto, recalculate visually dominant colours for the page and/or document (e.g. as described above) and update the record of visually dominant colours based on the recalculation. A colour change event may, for example, be adding a new element to a page, removing an element from a page, changing the colour of an existing element. The recolouring module 112 may be configured to recalculate dominant colours immediately on detecting a colour change event. Alternatively, the recolouring module 112 can be configured to delay recalculating dominant colours until it detects that the client module 108 is idle or consuming a relatively low level of CPU resources.

Examples of Recolouring

Examples of recolouring design elements will be described with reference to FIG. 7 and FIG. 8.

Figure 7:
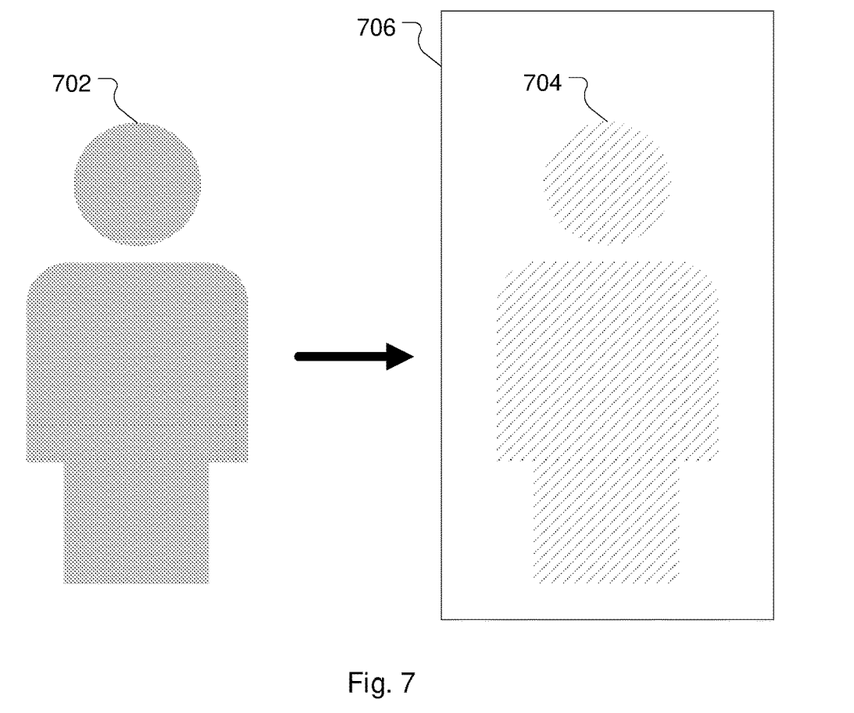
FIG. 7 is an example recolouring of a selected design element.

In FIG. 7, the design element 702 has been selected by the user. Initially the design element has a default colour of grey. The user places the design element 702 on to the page 706, which has a white background. The recolouring module 112 determines purple to be a sufficiently contrasting candidate colour (for example based on other elements added to the page—not shown). Therefore the recolouring module 112 recolours the design element as added to the page (now element 704) to purple.

Figure 8:
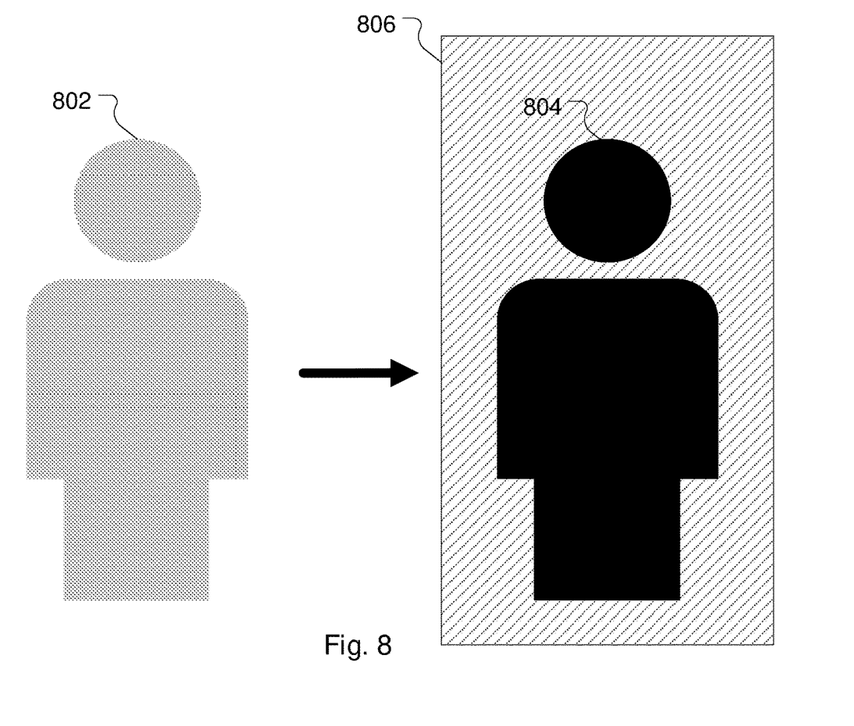
FIG. 8 is an example recolouring of a selected design element.

In the example of FIG. 8, the design element 802, which is the same design element as 702 above, has been selected by the user. Again, initially the design element is not recoloured. In this case, however, the page 806 on which the element is being placed has a purple background. Accordingly, in this case the recolouring module 112 determines that purple is not a candidate colour for design element 804 as there would be insufficient contrast between a purple-coloured design element 804 and the background. Instead, the recolouring module 112 determines that the design element 804 should be recoloured in orange, which is a new colour based on a luminance adjustment of one of the palette of colours associated with the document. Therefore the recolouring module 112 recolours the design element as added to the page (now element 804) to orange.

Example of Clustering

Figure 9:
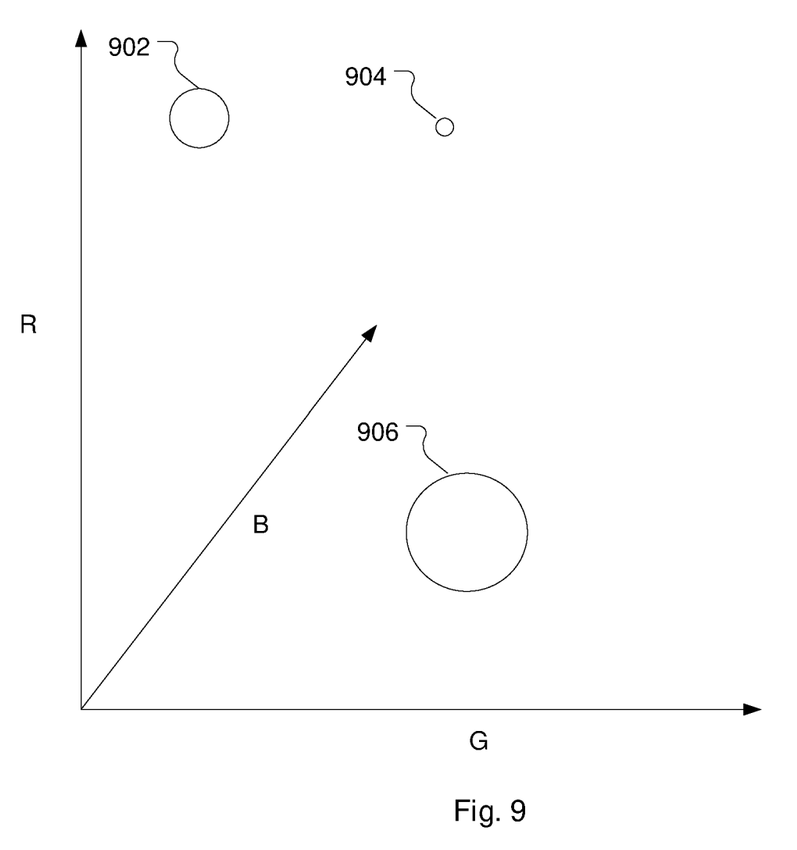
FIG. 9 is an example of clustering for the purposes of determining visually dominant colours.

In the example process above, the recolouring module 112 uses a clustering process. FIG. 9 illustrates an example of clustering colours in the RGB colour space.

The example in FIG. 9 illustrates the three dimensional space with clusters 902, 904 and 906 identified and represented by circles (although would in fact be spheres). Clusters 902, 904, and 906 have been determined by k-means clustering where k is 3. The recolouring module 112 identifies cluster 906 to be the largest cluster, and therefore may use an average colour of this cluster as the most visually dominant colour of the page.

Clusters 902, 904, and 906 cover all the colours used in the page in this example. In other examples, not all the colours may fit cleanly into a cluster. Some colours may not be determined to be in any cluster. In some cases, the recolouring module 112 may make an approximate estimation on the closest match as determined by a distance measure.

Several approaches to clustering using unsupervised learning techniques can be implemented, such as subspace clustering, projected clustering, hybrid approaches (that use a combination of both and heuristics to arrive at satisfactory answers), pattern based clustering and correlation clustering. By way of example, as one alternative to k-means clustering, the recolouring module 112 can be configured to use mean shift clustering techniques which automatically determine the number of clusters.

Recolouring of Design Element Previews

In some implementations the recolouring module 112 is also configured to detect a preview recolour event and, in response, to recolour design element previews (as displayed in the design element search and selection pane 310).

The recolouring module 112 can be configured to detect various design element preview events, for example: opening (or re-opening) a pane showing design element previews (e.g. search and selection pane 310); displaying new design element previews (e.g. arising from a design element search); detecting that document or page colours have changed (e.g. per a colour change event described above: a new design element being added to the document, a design element being deleted from the document, the colour of an existing design element being changed).

Once a preview recolouring process has been triggered, the recolouring module is configured to recolour the displayed design element previews using similar techniques to those described above. By way of example, the recolouring module 112 can be configured to perform the operations of process 400 in respect of each design element preview that is displayed.

When recolouring multiple design element previews based on a trigger event, however, the recolouring module 112 may be configured determine candidate colours (e.g. per 602, 604, 606, 608 and 610) once only—i.e. not once for each design element preview. Furthermore, when determining candidate colours for design element previews (which have not yet been placed on a page), the determination of sufficiently contrasting candidate colours at 608 can be made with reference to the colours (or dominant colours) of the currently displayed page as a whole rather than a specific region thereof. Colours for all design element previews are then selected from the candidate colours. In this case the same colours may be used for all design element previews, or different candidate colours/combinations of colours can be selected for different design element previews.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method for automatically recolouring a design element in a document, the method comprising:
    detecting user input adding the design element to the document, wherein prior to detecting the user input the document includes one or more existing elements; and
    in response to detecting the user input adding the design element to the document:
        determining, based on the one or more existing elements of the document, a set of candidate colours for the design element, the set of candidate colours comprising one or more candidate colours;
        selecting a recolouring colour for the design element from the set of candidate colours; and
        automatically recolouring the design element using the recolouring colour.

2. The computer implemented method of claim 1, wherein determining the set of candidate colours comprises determining any colours of recolourable design elements already present in the document and adding those colours to the set of candidate colours.

3. The computer implemented method of claim 1, wherein determining the set of candidate colours comprises determining one or more dominant colours and adding the one or more dominant colours to the set of candidate colours.

4. The computer implemented method of claim 3, wherein determining one or more dominant colours comprises determining one or more dominant colours of a page of the document to which the design element is being added.

5. The computer implemented method of claim 4, wherein determining one or more dominant colours of the page comprises calculating a plurality of pixel clusters and assigning a colour to each pixel cluster, each colour assigned to a pixel cluster being a dominant colour of the page.

6. The computer implemented method of claim 1, wherein selecting a recolouring colour from the set of candidate colours comprises:
    determining a contrasting candidate colour from the set of candidate colours and selecting the contrasting candidate colour as the recolouring colour.

7. The computer implemented method of claim 6, wherein determining a contrasting candidate colour from the set of candidate colours comprises:
    determining one or more colours of a border region surrounding a location at which the design element is positioned; and
    determining a recolouring colour from the set of candidate colours that contrasts with the one or more colours of the border region.

8. The computer implemented method of claim 1, wherein the design element comprises an outline component, and wherein recolouring the design comprises recolouring the outline component.

9. The computer implemented method of claim 1, wherein the design element comprises a fill component, and wherein recolouring the design comprises recolouring the fill component.

10. The computer implemented method of claim 1, wherein:
    prior to determining a set of candidate colours the method comprises determining whether the design element should be recoloured; and
    recolouring the design element is only performed in response to determining that the design element should be recoloured.

11. The computer implemented method of claim 10, wherein determining whether the design element should be recoloured comprises:
    determining if the design element is a simple design element; and
    in response to determining that the design element is a simple design element, determining that the design element should be recoloured.

12. The computer implemented method of claim 11, wherein determining whether the design element is a simple design element comprises:
  determining a number of colours in the design element;
  comparing the number of colours in the design element with a threshold number of colours; and
  if the number of colours in the design element is less than or equal to the threshold number of colours, determining the design element to be a simple design element.

13. The computer implemented method of claim 11, wherein determining whether the design element is a simple design element comprises:
  determining a compressed size of the design element;
  comparing the compressed size of the design element with a threshold size; and
  if the compressed sized is less than or equal to the threshold size, determining the design element to be a simple design element.

14. The computer implemented method of claim 10, wherein determining whether the design element should be recoloured comprises:
  determining if the design element has a predominantly grey appearance; and
  in response to determining that the design element has a grey appearance, determining that the design element should be recoloured.

15. The computer implemented method of claim 14, wherein determining whether the design element has a predominantly grey appearance comprises:
  determining one or more design element chroma values, each design element chroma value being in respect of a recolourable component of the design element;
  comparing the or each design element chroma values with a threshold chroma value; and
  if any design element chroma value exceeds the threshold chroma value, determining the design element to have a predominantly grey appearance.

16. A computer processing system comprising:
  a processing unit;
  a communication interface; and a non-transient computer-readable storage medium storing sequences of instructions, which when executed by the processing unit, cause the processor to perform a method comprising:
    detecting user input adding the design element to the document, wherein prior to detecting the user input the document includes one or more existing elements; and
    in response to detecting the user input adding the design element to the document:
      determining, based on the one or more existing elements of the document, a set of candidate colours for the design element, the set of candidate colours comprising one or more candidate colours;
      selecting a recolouring colour for the design element from the set of candidate colours; and
      automatically recolouring the design element using the recolouring colour.

17. The computer processing system of claim 16, wherein determining the set of candidate colours comprises determining any colours of recolourable design elements already present in the document and adding those colours to the set of candidate colours.

18. A non-transient storage medium readable by a processor, the storage medium storing instructions executable by one or more processors to cause the one or more processors to perform a method comprising:
  detecting user input adding the design element to the document, wherein prior to detecting the user input the document includes one or more existing elements; and
  in response to detecting the user input adding the design element to the document:
    determining, based on the one or more existing elements of the document, a set of candidate colours for the design element, the set of candidate colours comprising one or more candidate colours;
    selecting a recolouring colour for the design element from the set of candidate colours; and
    automatically recolouring the design element using the recolouring colour.

19. The non-transient storage medium of claim 18, wherein determining the set of candidate colours comprises determining any colours of recolourable design elements already present in the document and adding those colours to the set of candidate colours.

* * * * *